April 29, 1952 M. H. KRUGER Re. 23,485
COMBINATION LIGHT DISTRIBUTOR AND WIRING CONDUIT FOR ELONGATED TUBULAR LAMPS
Original Filed March 29, 1951 5 Sheets-Sheet 1
Fig. 1.
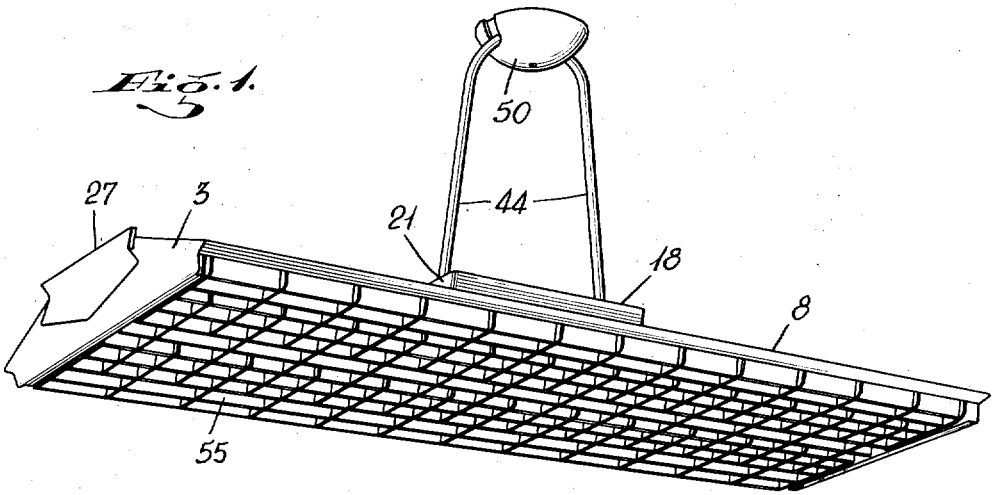
Fig. 2.
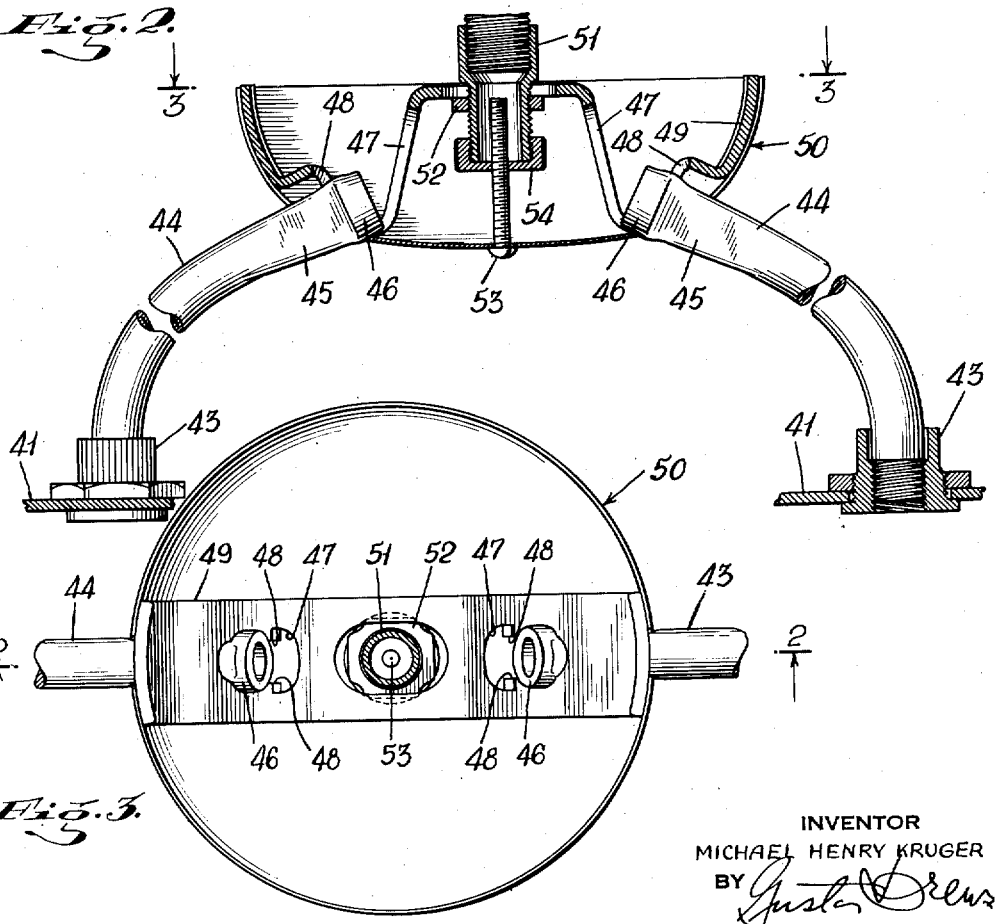
Fig. 3.
INVENTOR
MICHAEL HENRY KRUGER
BY Gustav Drews
ATTORNEY April 29, 1952 M. H. KRUGER Re. 23,485
COMBINATION LIGHT DISTRIBUTOR AND WIRING CONDUIT FOR ELONGATED TUBULAR LAMPS
Original Filed March 29, 1951 5 Sheets-Sheet 2
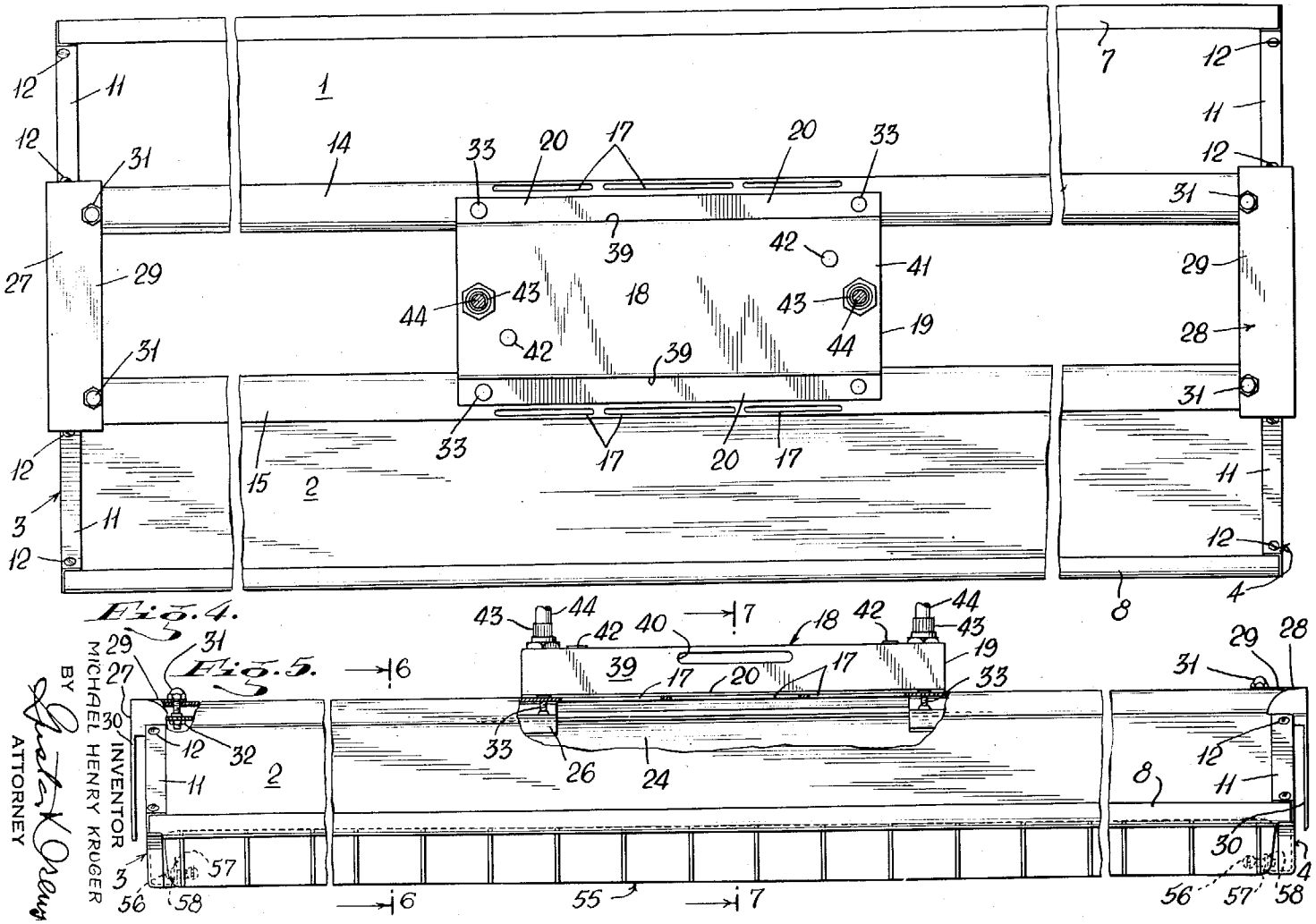
INVENTOR
MICHAEL HENRY KRUGER
BY Gustav Orenz
ATTORNEY April 29, 1952 M. H. KRUGER Re. 23,485

COMBINATION LIGHT DISTRIBUTOR AND WIRING CONDUIT FOR ELONGATED TUBULAR LAMPS

Original Filed March 29, 1951 5 Sheets-Sheet 3

INVENTOR
MICHAEL HENRY KRUGER
BY Gustav Drews
ATTORNEY

April 29, 1952 M. H. KRUGER Re. 23,485

COMBINATION LIGHT DISTRIBUTOR AND WIRING CONDUIT FOR ELONGATED TUBULAR LAMPS

Original Filed March 29, 1951 5 Sheets-Sheet 4

INVENTOR
MICHAEL HENRY KRUGER
BY Gustav Orews
ATTORNEY

April 29, 1952 M. H. KRUGER Re. 23,485

COMBINATION LIGHT DISTRIBUTOR AND WIRING CONDUIT FOR ELONGATED TUBULAR LAMPS

Original Filed March 29, 1951 5 Sheets-Sheet 5

INVENTOR
MICHAEL HENRY KRUGER
BY Gustav Drews
his ATTORNEY

Reissued Apr. 29, 1952 Re. 23,485

UNITED STATES PATENT OFFICE 23,485

COMBINATION LIGHT DISTRIBUTOR AND WIRING CONDUIT FOR ELONGATED TUBULAR LAMPS

Michael Henry Kruger, Malden, Mass., assignor to A. L. Smith Iron Company, Chelsea, Mass., a corporation of Massachusetts Original No. 2,559,641, dated July 10, 1951, Serial No. 218,174, March 29, 1951. Application for reissue February 12, 1952, Serial No. 271,256.

9 Claims. (Cl. 240—51.11)

Matter enclosed in heavy brackets [ ] appears in the original patent but forms no part of this reissue specification; matter printed in italics indicates the additions made by reissue.

This invention relates to lighting fixtures in general, and more especially to combination light distributors and wiring conduits for fluorescent lamp units, and constitutes a continuation in part of co-pending application for patent, Ser. No. 32,333, now abandoned, filed June 11, 1948.

Among the objects of the present invention it is aimed to provide an improved lighting fixture characterized by a combination light distributor and wiring conduit for a fluorescent lamp unit which will house the wiring and will enable a uniform distribution of light rays on the ceiling or the like downwardly facing upper surface and yet shield the upper face of the lamp or interpose a shield above the upper face of the lamp to intercept falling dust particles and the like without interfering with the uniform distribution of the light rays to an upper light deflecting surface such as the ceiling of a room.

It is still another object of the present invention to provide an improved light fixture characterized by a combination light distributor and wiring conduit for a fluorescent lamp unit which will house the wiring and control the path of the light rays to a lower area so that the glare from the direct light rays will be prevented and in addition there will be effected a uniform distribution of the light rays to an upper deflecting surface, such as a ceiling, without exposing the upper surfaces of the lamp units to falling dust particles.

These and other features, capabilities and advantages of the invention will appear from the subjoined detailed description of specific embodiments thereof illustrated in the accompanying drawings, in which Fig. 1 is a perspective of one embodiment.

Fig. 2 is an enlarged fragmental view partly in section of a hanger.

Fig. 3 is a section on the line 3—3 of Fig. 2.

Fig. 4 is a plan enlarged relative to Fig. 1, partly broken away.

Fig. 5 is a side elevation partly broken away on the scale of Fig. 4.

Figure 6:
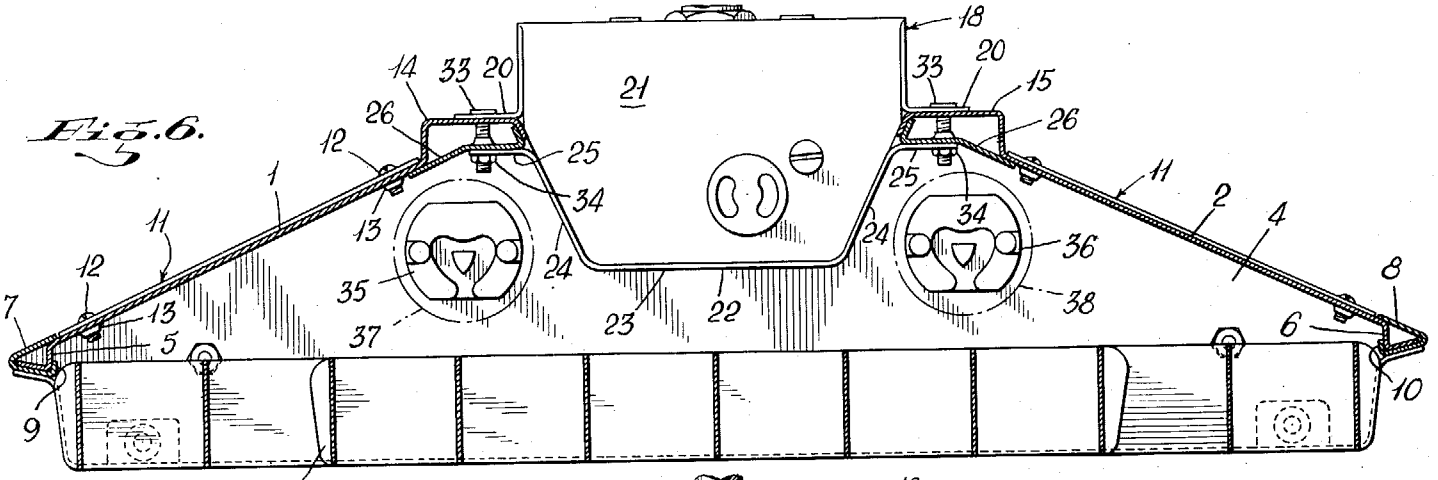
Fig. 6 is a section still further enlarged on the line 6—6 of Fig. 5.

In the embodiment particularly shown in Figs. 1 to 7, inclusive, there is illustrated a combination lighting fixture and wiring conduit having two deflecting wall members 1 and 2 inclining downward in their outward direction and connected at their ends by the end wall members 3 and 4. These main wall members 1 to 4, inclusive, are preferably composed of metal coated with any suitable metal paint, enamel or the like. For the purpose of ready assembly and manufacture, the lower outer end portions 5 and 6 of the inclined walls 1 and 2, respectively, are bent into a V shape to receive the ornamental strips 7 and 8 also bent into V shape to conform to, and telescopically receive, the V-shaped end portions 5 and 6, the strips 7 and 8 having upwardly turned flanges 9 and 10, respectively, at their inner ends to engage the inner faces of the V-shaped end portions 5 and 6 of the walls 1 and 2.

The end walls 3 and 4 may be secured to the laterally extending outer end portions of the walls 1 and 2 by any suitable means, in the present instance the walls 3 and 4 having inwardly extending flanges 11 engaging the upper faces of the end portions of the walls 1 and 2 to enable fastening means, such as the screws 12 and extruded portions 13, to secure the flanges 11 to the end portions of the walls 3 and 4.

Preferably as shown, the upper parallel end portions 14 and 15 of the side walls 1 and 2, respectively, are bent to form upwardly projecting channels or troughs. The upper wall portions of the end portions 14 and 15, see Fig. 4, each have extended openings 17 therein extending the full length of the ballast casing 18. The ballast casing 18 consists essentially of an upper casing sheet 19 having laterally extending flanges 20 secured to the upper wall of the wire trough forming end portions 14 and 15, and the end walls 21 extending down between the inner edges of the end portions 14 and 15. The lower end of the ballast casing 18 is provided with a closure plate 22 having the base 23 and the two upwardly and outwardly inclined walls 24 with flanges 25 at the free ends thereof which are secured to the lower faces of the ends of the strips 26 which form the closures for the lower ends of the troughs between the casing 18 and the end walls 3 and 4, it being noted that the strips 26 do not extent the length of the casing 18, see Fig. 4, but enable at least part of the light rays from the lamps hereinafter to be described to pass up directly through the openings 17 to the ceiling above.

Preferably as shown, the decorative end pieces 27 and 28 have horizontally extending flanges 29 and downwardly extending aprons 30 with fastening means, such as the screws 31, extending down through the outer ends of the flanges 29, upper walls of the trough extensions 14 and 15 and strips 26, the nuts 32 being connected to the lower ends of the screws 31, see Fig. 5, and in turn the threaded studs 33 having their heads welded to the flanges 20 of the housing 18 extend down through the flanges 20, upper walls of the extensions 14 and 15, the inner ends of the strips 26 and the flanges 25, the nuts 34 being connected to the lower ends of the studs 33.

In the inner faces of the end walls 3 and 4 directly below the trough forming extensions 14 and 15, there are disposed the connections 35 and 36 for the ends of the fluorescent lamps 37 and 38 indicated in dotted lines in Figs. 6 and 7.

The vertically extending walls 39 of the casing sheet 19 are provided with openings 40, and the upper wall 41 of the casing sheet 19 is provided with fastening means, such as the screws 42, to secure the ballast housing 159 inside of the casing 18.

As shown in Figs. 2 and 3, the upper wall 41 is also provided with openings to receive bushings 43 which may be secured to the ends of the curved stems 44.

The upper ends of the stems 44, in the present instance, are indented at 45 adjacent their upper circular heads 46 so that after the heads 46 have been passed through the enlarged recess portions 47, the neck or indented portions 45 may slide up into the diminished recess portions 48 of the strap 49 secured in the dome-shaped disk or canopy 50. The strap 49 is connected by any suitable means, such as the bushing 51 and nut 52, to the lower end of the conduit or the like fixed in the ceiling, and the disk or canopy 50 in turn is connected to the lower end of the bushing 51 by any suitable means, such for instance as the screw 53, extending up through the disk or canopy 50 into the cap 54, screw threadedly connected to the lower end of the bushing 51.

Any suitable light disbursing, distributing or control means may be secured to the lower edges of either the side walls 1 and 2 and/or the lower edges of the end walls 3 and 4. For this embodiment there is illustrated an egg crate louver frame 55 which is illustrated as equipped with pins 56 extending through ends of the frame 55, see Fig. 5, and into tabs 57 extending inwardly from the end walls 3 and 4, the ends of which pins 56 have screw threadedly connected thereto the extruded portions 58.

From the foregoing it will thus be seen that the wiring not shown from the ballast 159 may pass into the channels or troughs formed between the upper walls of the wall members 14 and 15 and the flanges 26 to the connections 35 and 36 of the lamps 37, that, in turn, the direct rays from the lamps 37 may pass up through the space between the casing 18 and the end walls 3 and 4 at an angle to the vertical, and directly up from the lamps 37 vertically, through the openings 17 adjacent the casing 18 to the ceiling, and that the comparatively large amount of light rays so directed at an angle to the ceiling through the openings between the casing 18 and the end walls 3 and 4 will blend with the small amount of light rays directed up vertically through the openings 17 to avoid any objectionable high light spots or shadows above the lighting fixture, that in turn the light rays directed down from the lamps 37 will be interrupted or deflected by the louvers of the frame 55 so that the glare from direct light rays will be prevented and only indirect light rays pass into the line of vision of occupants of the room with which the lighting fixture is equipped.

Still, furthermore, it will be seen that the lamps 37 will be protected from falling dust particles. While a heavily dust laden atmosphere will, of course, distribute some dust particles laterally in a horizontal direction, as well as vertically, it is of course obvious, since the upper faces of lamps always have a much thicker coat of dust than any lateral face, and the lower faces generally have the thinnest coat of dust, that dust particles, when they finally come to rest, mainly drop vertically by gravity, and consequently, if as here provided the upper faces of the lamps 37 have immediately above the same an interposer, such as the troughs formed by the walls 14, 15 and flanges 26, the dust that will collect on the lamps 37 may only gain access to the upper surfaces of the lamps from the side, and therefore the most vulnerable faces, to dust, of the lamps 37 will be effectively protected.

Figure 8:
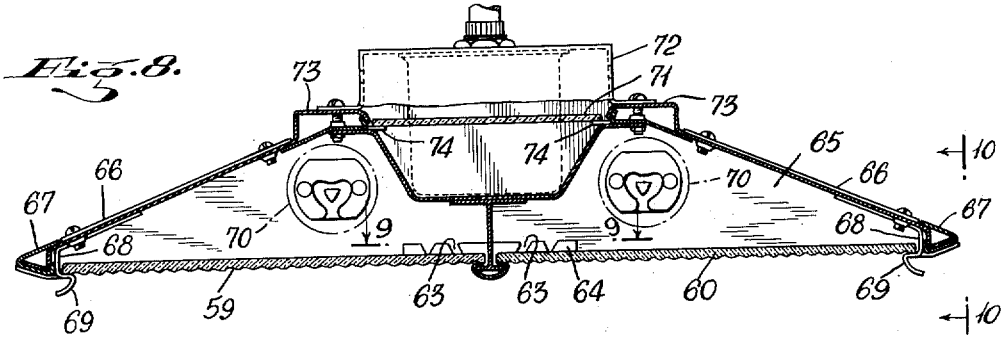
Fig. 8 is a transverse section reduced as compared to the scale of Fig. 6 of another embodiment.
Figure 9:
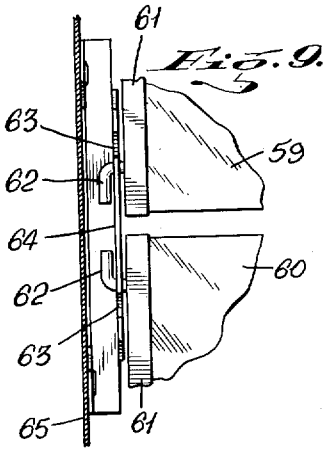
Fig. 9 is a fragmental section on the line 9—9 of Fig. 8.
Figure 10:
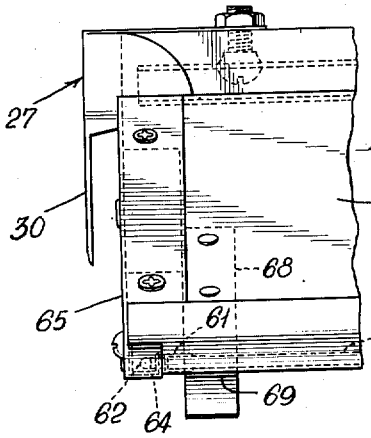
Fig. 10 is a fragmental enlarged front elevation on the line 10—10 of Fig. 9.

In place of the egg crate louver frame 55, excellent results have also been achieved when, as shown in Figs. 8, 9 and 10, a translucent glass frame or frames was used.

In the embodiment illustrated in Figs. 8, 9 and 10, there are provided two translucent glass frames 59 and 60. These frames preferably have secured to their ends the metal straps 61 from which extend the J-shaped projections 62, which in turn are received in the inclined recesses 63 formed in the plate 64 secured to the inner face of the end wall 65. At the outer ends of the inclined walls 66 adjacent the strips 67 there are secured the brackets 68 having the yieldable shoulders 69 at the lower ends thereof to receive the outer edges of the glass frames 59 and 60 when the glass frames 59 and 60 are in closed position. If it is desired to gain access to the lamps 70 or the inside of the lighting fixture, it is only necessary to free one or both frames 59 and 60 from the yieldable shoulders 69 and allow one or both of them to pivot down about the pivotal point formed between the projections 62 and the plate 64.

As in the embodiment of Figs. 1 to 7, inclusive, as distinguished from the present embodiment, if the space between the wire conduits is free, the dust which may drop through this space will of course in turn drop through the louver frame 55, whereas in the present instance it will drop and rest on the inner face of the translucent frames 59 and 60. When so pivotally mounted, however, the inner faces of the glass frames 59 and 60 can easily be swung into position where the inner faces can be cleaned.

Figure 7:
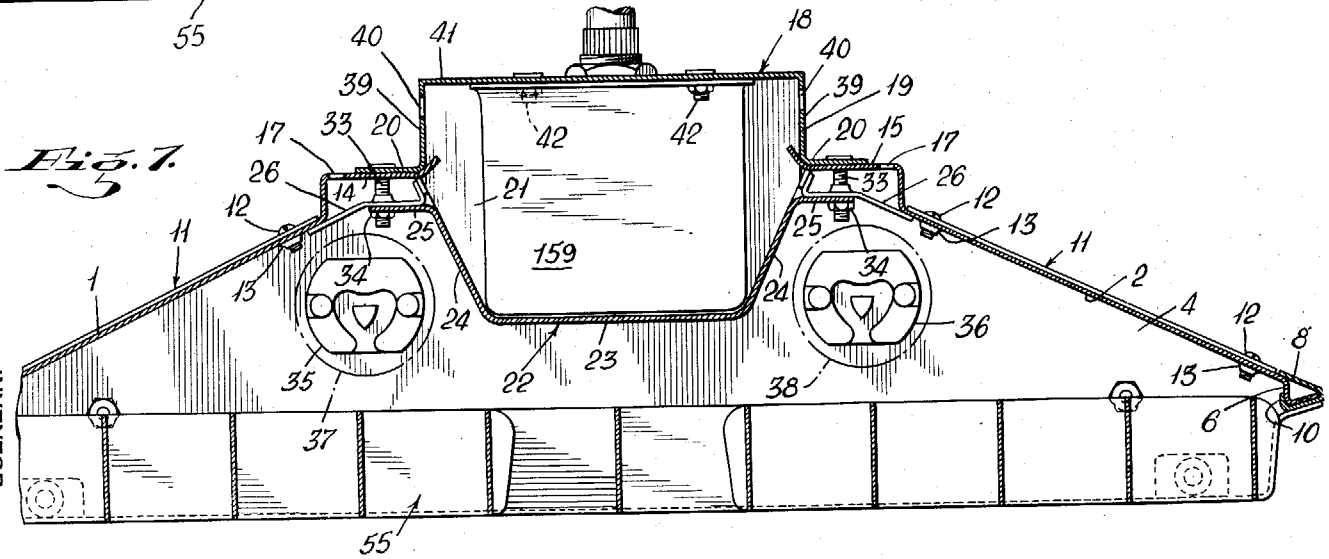
Fig. 7 is a section on the scale of Fig. 6 on the line 7—7 of Fig. 5.

However, to protect the inner faces of the glass plates 59 and 60 from the deposit of dust particles it may be desirable, as shown in Fig. 6, to provide translucent glass plates, such as the glass plates 71, between the ballast housing 72 and the end walls 65. Preferably to support these translucent glass frames 71, the upper walls 73 of the wire conduit troughs have inner extensions, such as the flanges 74.

Figure 11:
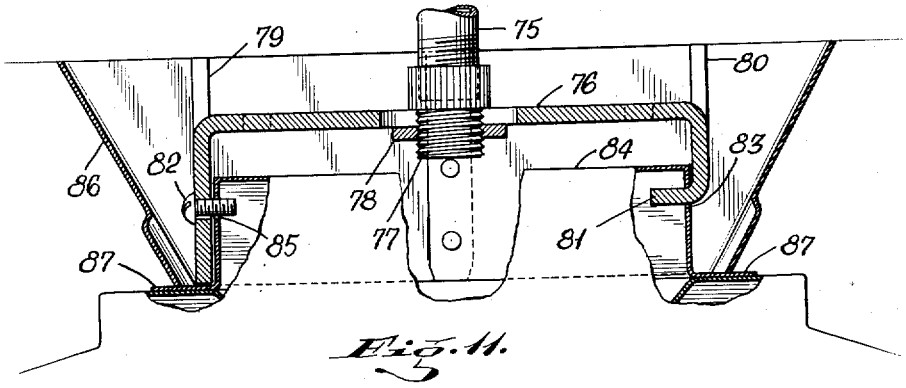
Fig. 11 is a fragmental transverse section of still another embodiment.

In place of the hanger shown, particularly in Figs. 2 and 3, when the lighting fixture is intended to be located adjacent the ceiling, the embodiment illustrated in Fig. 11 may be used to advantage. In such instance, to the conduit 75 fixed to the ceiling there is secured the strap 76 by means of the bushing 77 and nut 78. This strap has two upward extensions 79 and 80 to engage the ceiling with a hook or projection 81 disposed below the extension 80 and a screw 82 disposed below the extension 79. The projection 81 is in such case inserted into the opening 83 in the ballast casing 84, see for instance the opening 40 in the ballast casing 18 of the embodiment illustrated in Fig. 7, and the screw 82 will engage in the opening or slot 85 formed in the ballast casing 84. In the act of assembling it will only be necessary to raise or elevate the lighting fixture until the opening 83 of the ballast casing 84 receives the projection 81 while the housing 84 is inclined relative to the ceiling and then swing the same upward about the projection 81 as a fulcrum until the opening 85 registers with the screw 82, and then turn the screw 82 to project into the opening 85. The canopy 86 will be produced in two parts to be subsequently secured in place on the flanges 87, after the screw 82 has been turned into locking engagement with the ballast housing 84.

Excellent results have been achieved when the lighting fixture illustrated in the embodiment of Figs. 1 to 7, inclusive, is about fifty-one inches from end wall 3 to end wall 4 and the ballast housing is disposed about centrally of the same and does not exceed fifteen inches in length, and that the dimensions of the embodiment illustrated in Fig. 8 are similar.

Figure 12:
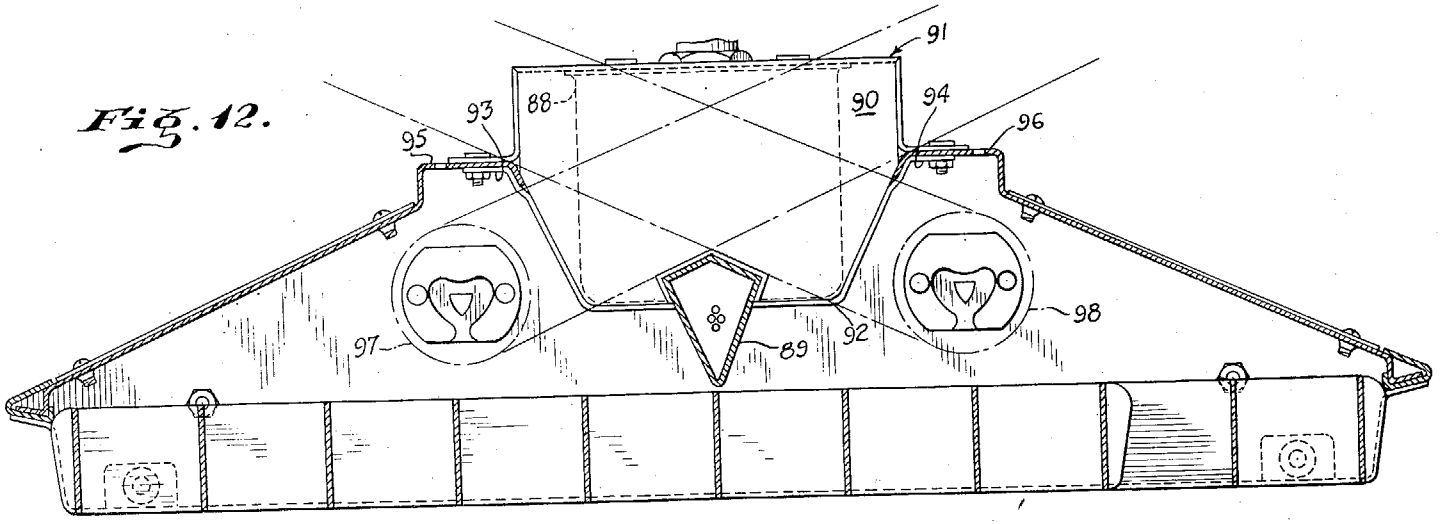
Fig. 12 is a section similar to Fig. 6 of a third embodiment in which the wire trough extends along the middle of the fixture between the elongated tubular lamps.

The embodiment shown in Fig. 12 differs from the embodiment shown in Fig. 6 primarily in that the trough for the wires to the ballast housing 88 is provided by the chamber forming longitudinally extending housing 89 which extends from one end wall, such as the end wall 3 of the embodiment shown in Fig. 5, to the downwardly extending end plate 90 of the supporting bracket 91, whereas in the embodiment shown in Fig. 6 the trough for the wires to the ballast housing 159 is provided between the plates 26 and the end portions 14 and 15.

In the embodiment of Fig. 12, furthermore, the intermediate strap 92 for the ballast housing 88 has its flanges 93 and 94 connected to the lower faces of the end portions 95 and 96, respectively. The light rays from the lamps 97 and 98 in this case will clear the upper faces of the elongated housing 89 as shown.

Figure 13:
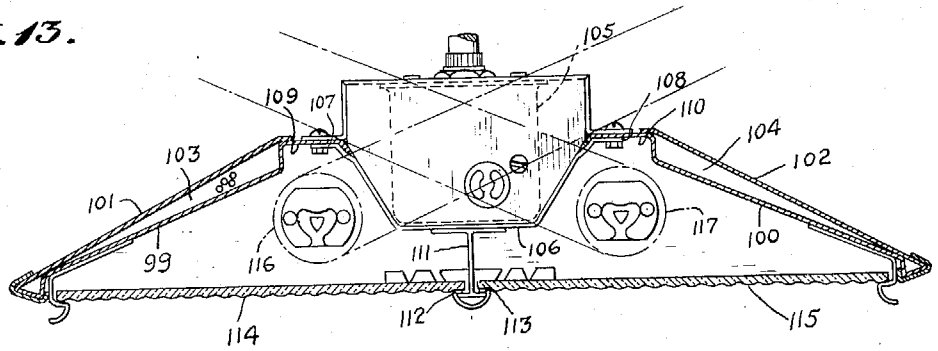
Fig. 13 is a section similar to Fig. 8 of a fourth embodiment in which the wire trough is formed in the main downwardly flaring walls of the fixture.

The embodiment shown in Fig. 13, on the other hand, differs primarily from the embodiment shown in Fig. 8 in that the downwardly deflecting longitudinal wall members 99 and 100 have extensions 101 and 102, respectively, extending back over but spaced from the upper faces of the wall members 99 and 100, respectively, to form the chambers 103 and 104, respectively, for the wires to the ballast housing 105. The intermediate strap 106 below the ballast housing 105 has its flanges 107 and 108 connected to the lower faces of the inwardly extending portions 109 and 110, respectively, of the wall members 99 and 100, respectively. When desired as shown, the intermediate strap 106 may have secured thereto the bracket 111 having the supporting shoulders 112 and 113 on which the inner edges of the glass frames 114 and 115 may rest as shown. In this case similarly the direct light rays from the lamps 116 and 117 will extend at an angle to the ceiling.

As has been described above, the light distributing means can be variable as indicated in the embodiments outlining the egg-crate louver and the glass panels. Similarly, where no shielding of the lamps is required, the light distributing means may be omitted without departing from the spirit of the invention.

It is obvious that various changes and modifications may be made to the details of construction without departing from the general spirit of the invention as set forth in the appended claims.

I claim:

1. In a lighting fixture, the combination with a main frame having two elongated spaced apart opaque side plates inclining downwardly in an outward lateral direction, opaque end plates for connecting the side plates to one another, lamp sockets for fluorescent lamps in said end plates, a ballast housing connected at the inner ends of said side plates and spaced from said end plates, wire troughs formed at, and under, the inner ends of said side plates and extending from said ballast housing to said sockets, and lamps connected to said sockets below said side plates to enable light rays therefrom to be directed upward at an angle through the space between said side plates.

2. The combination as set forth in claim 1 in which the side plates adjacent the ballast housing only are provided with narrow longitudinally extending openings to enable narrow bands of the light rays from narrow portions only of the lamps therebeneath to pass directly up therethrough and light rays from other portions of the lamps to be directed upward at an angle to dissolve into the light area formed by said direct light rays and to dissolve into the light area formed by the light rays passing up through the space between the side plates beyond the ends of the ballast housing.

3. In a lighting fixture, the combination with a main frame having two elongated spaced apart opaque side plates inclining downwardly in an outward lateral direction, opaque end plates for connecting the side plates to one another, lamp sockets for fluorescent lamps in said end plates, a ballast housing connected at the inner ends of said side plates and spaced from said end plates, wire troughs formed at, and under, the inner ends of said side plates and extending from said ballast housing to said sockets, lamps connected to said sockets below said side plates to enable light rays therefrom to be directed upward at an angle through the space between said side plates, and horizontally extending translucent glass frames secured at the lower ends of the side plates and end plates to form a closure with the main frame and to direct the light rays out of the line of vision of occupants of the room in which the lighting fixture is located.

4. The combination as set forth in claim 3 in which the glass frames are pivotally connected to the end plates foldable toward one another toward the longitudinal middle of the main frame, and means are provided at the lower ends of the side frames to engage the outer edges of the glass frames to support them in light distributing position.

5. The combination as set forth in claim 3 in which the glass frames are pivotally connected to the end plates and foldable toward one another, and supporting means at the lower ends of the side plates consisting of yieldable clips for anchoring the outer ends of the glass frames to the lower ends of the side frames.

6. In a lighting fixture, the combination of a main frame having two elongated spaced apart opaque side plates inclining downwardly in an outward lateral direction, opaque end plates connecting the side plates to one another, lamp sockets for fluorescent lamps at said end plates, a ballast housing connected at the inner ends of said side plates and spaced from said end plates so as to cover only a minor part of the space between the side plates, and at least one lamp disposed below and adjacent to each side plate within the vertically projected area thereof, to enable light rays therefrom to be directed upwardly at an angle through the space between the side plates.

*7. The combination as set forth in claim 6 in which a longitudinally extending housing extends between said side plates and is connected to said end plates and to said ballast housing and is adapted to accommodate the wires from said ballast housing to said lamp sockets.*

*8. The combination as set forth in claim 6 in which a longitudinally extending housing extends between said side plates and is connected to said end plates and in which said ballast housing is connected to said longitudinally extending housing between said end plates, and said longitudinally extending housing is adapted to accommodate wires extending from the ballast housing to said lamp sockets.*

*9. In a lighting fixture, the combination of a main frame having two elongated spaced apart opaque side plates inclining downwardly in an outward lateral direction, opaque end plates connecting the side plates to one another, lamp sockets for fluorescent lamps at said end plates, a ballast housing disposed between the inner ends of said side plates and spaced from said end plates so as to interrupt only a minor part of the space between the side plates, at least one lamp disposed below and adjacent to each side plate within the vertically projected area thereof to enable light rays therefrom to be directed upwardly at an angle through the space between the side plates, and a longitudinally extending housing disposed between said side plates and between said lamps clear of the vertically projected area above the lamps, said longitudinally extending housing being connected to said end plates and to said ballast housing and adapted to accommodate wires extending from said ballast housing to said lamp sockets.*

MICHAEL HENRY KRUGER.

REFERENCES CITED

The following references are of record in the file of this patent or the original patent:

FOREIGN PATENTS

| Number | Country | Date |
|---|---|---|
| 560,805 | Great Britain | Apr. 20, 1944 |